US011077405B2

(12) United States Patent
Mikawa et al.

(10) Patent No.: US 11,077,405 B2
(45) Date of Patent: Aug. 3, 2021

(54) MODULE FOR GAS SEPARATION, AND GAS SEPARATION METHOD

(71) Applicant: Asahi Kasei Kabushiki Kaisha, Tokyo (JP)

(72) Inventors: Masato Mikawa, Tokyo (JP); Yasutaka Kurishita, Tokyo (JP); Azusa Yamanaka, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 470 days.

(21) Appl. No.: 16/080,692

(22) PCT Filed: Mar. 3, 2017

(86) PCT No.: PCT/JP2017/008580
§ 371 (c)(1),
(2) Date: Aug. 29, 2018

(87) PCT Pub. No.: WO2017/150721
PCT Pub. Date: Sep. 8, 2017

(65) Prior Publication Data
US 2019/0076786 A1      Mar. 14, 2019

(30) Foreign Application Priority Data

Mar. 4, 2016   (JP) .............................. JP2016-042529

(51) Int. Cl.
*B01D 53/22*      (2006.01)
*B01D 63/02*      (2006.01)
(Continued)

(52) U.S. Cl.
CPC ......... *B01D 63/022* (2013.01); *B01D 53/228* (2013.01); *B01D 61/00* (2013.01);
(Continued)

(58) Field of Classification Search
CPC ........ B01D 63/00; B01D 69/12; B01D 61/00; B01D 63/022; B01D 71/68; B01D 71/34;
(Continued)

(56) References Cited

U.S. PATENT DOCUMENTS 3,041,302 A  *  6/1962  Leutner ................... C08L 61/20
                                                524/390
5,091,080 A  *  2/1992  van Eikeren ...... B01D 19/0031
                                                210/188

(Continued)

FOREIGN PATENT DOCUMENTS

CN        1056826 A1    12/1991
EP        3184558 A1     6/2017
(Continued)

OTHER PUBLICATIONS

International Search Report issued in corresponding International Patent Application No. PCT/JP2017/008580 dated May 30, 2017.
(Continued)

*Primary Examiner* — Anthony R Shumate
(74) *Attorney, Agent, or Firm* — Morgan, Lewis & Bockius LLP (57) ABSTRACT

Module for gas separation that maintains moisture retention of a gas separation active layer at a uniform level has a composite hollow-fiber membrane configured as the interior of an exterior body and has a porous hollow-fiber support body and a gas separation active layer disposed on the surface of the hollow-fiber support body. The exterior body has a supply port and a discharge port for a first gas passing through the outer side of the composite hollow-fiber membrane, and a supply port and a discharge port for a second gas passing through the inner side of the composite hollow-fiber membrane. The first gas flows through a first space enclosed by the exterior body and the outer side of the composite hollow-fiber membrane and the second gas flows
(Continued)

through a second space separated by the composite hollow-fiber membrane and the exterior body. The first space is filled with an absorbing solution.

30 Claims, 3 Drawing Sheets

(51) Int. Cl.
| | | |
|---|---|---|
| | *B01D 69/10* | (2006.01) |
| | *B01D 69/12* | (2006.01) |
| | *B01D 71/34* | (2006.01) |
| | *B01D 71/68* | (2006.01) |
| | *B01D 69/00* | (2006.01) |
| | *B01D 63/00* | (2006.01) |
| | *B01D 61/00* | (2006.01) |

(52) U.S. Cl.
CPC ............. *B01D 63/00* (2013.01); *B01D 63/02* (2013.01); *B01D 69/00* (2013.01); *B01D 69/10* (2013.01); *B01D 69/12* (2013.01); *B01D 71/34* (2013.01); *B01D 71/68* (2013.01)

(58) Field of Classification Search
CPC ...... B01D 53/228; B01D 69/00; B01D 69/10; B01D 63/02
See application file for complete search history.

(56) References Cited

U.S. PATENT DOCUMENTS

| | | | |
|---|---|---|---|
| 5,135,547 A | 8/1992 | Tsou et al. | |
| 5,817,165 A | 10/1998 | Hachisuka et al. | |
| 8,092,581 B2 | 1/2012 | Sugiyama et al. | |
| 9,233,344 B1* | 1/2016 | Liu | B01D 69/08 |
| 2008/0134895 A1* | 6/2008 | Ruud | B01D 69/10 |
| | | | 96/9 |
| 2012/0031831 A1 | 2/2012 | Kanougi et al. | |
| 2012/0186446 A1* | 7/2012 | Bara | B01D 69/12 |
| | | | 95/44 |
| 2014/0343341 A1* | 11/2014 | Kawakami | C07C 7/13 |
| | | | 585/802 |
| 2014/0352540 A1* | 12/2014 | Okada | C01B 3/503 |
| | | | 96/12 |
| 2014/0377156 A1* | 12/2014 | Okada | B01D 53/228 |
| | | | 423/228 |
| 2015/0122735 A1* | 5/2015 | Yang | B01D 71/12 |
| | | | 210/652 |
| 2015/0300231 A1* | 10/2015 | Panziera | B01D 63/043 |
| | | | 95/9 |
| 2015/0336056 A1* | 11/2015 | Ouchi | B01D 71/46 |
| | | | 422/211 |
| 2016/0016111 A1* | 1/2016 | Sirkar | B01D 53/1475 |
| | | | 423/228 |
| 2016/0030880 A1 | 2/2016 | Wong et al. | |
| 2016/0051938 A1 | 2/2016 | Okada et al. | |
| 2016/0207006 A1* | 7/2016 | Furuyama | H04R 1/023 |
| 2017/0189860 A1 | 7/2017 | Tanizaki et al. | |
| 2018/0043298 A1* | 2/2018 | Liskey | B01D 67/0088 |
| 2018/0087075 A1* | 3/2018 | Tracy | C12P 7/52 |
| 2018/0133661 A1* | 5/2018 | Liu | B01D 69/10 |
| 2018/0133663 A1* | 5/2018 | Liu | B01D 71/70 |
| 2018/0243685 A1* | 8/2018 | Henson | B01D 53/229 |
| 2018/0265993 A1* | 9/2018 | Kamire | B01D 53/326 |
| 2019/0111382 A1* | 4/2019 | Liang | B01D 53/22 |
| 2019/0193022 A1* | 6/2019 | Yamanaka | B01D 69/02 |
| 2019/0241509 A1* | 8/2019 | Kayser | C07C 309/15 |

FOREIGN PATENT DOCUMENTS

| | | | | |
|---|---|---|---|---|
| JP | S63-218231 A | 9/1988 | | |
| JP | H04-285897 A | 10/1992 | | |
| JP | H06-099018 A | 4/1994 | | |
| JP | H09-000898 A | 1/1997 | | |
| JP | 2002-239353 A | 8/2002 | | |
| JP | 2002-308608 A | 10/2002 | | |
| JP | 2005-000838 A | 1/2005 | | |
| JP | 2008-515668 A | 5/2005 | | |
| JP | 2005-246222 A | 9/2005 | | |
| JP | 2005-527822 A | 9/2005 | | |
| JP | 2005-290151 A | 10/2005 | | |
| JP | 2008-149235 A | 7/2008 | | |
| JP | 2011-011098 A | 1/2011 | | |
| JP | 2011-161387 A | 8/2011 | | |
| JP | 2011-206721 A | 10/2011 | | |
| JP | 5019502 B2 | 9/2012 | | |
| JP | 2013-022581 A | 2/2013 | | |
| JP | 2014-004535 A | 1/2014 | | |
| JP | 5507079 B2 | 5/2014 | | |
| JP | 2014-133219 A | 7/2014 | | |
| WO | 03/100410 A1 | 12/2003 | | |
| WO | 2007/001405 A2 | 1/2007 | | |
| WO | 2010/114010 A1 | 10/2010 | | |
| WO | 2014/157069 A1 | 10/2014 | | |
| WO | WO-2014197977 A1 * | 12/2014 | ........... | B01D 71/024 |
| WO | 2015/186705 A1 | 12/2015 | | |
| WO | 2016/027595 A1 | 2/2016 | | |

OTHER PUBLICATIONS

International Preliminary Report on Patentability and Written Opinion issued in corresponding International Patent Application No. PCT/JP2017/008580 dated Sep. 13, 2018.

* cited by examiner

MODULE FOR GAS SEPARATION, AND GAS SEPARATION METHOD

FIELD

The present invention relates to a module for gas separation and a gas separation method whereby a desired gas component in a source gas is absorbed into an absorbing solution and the desired gas component in the absorbing solution is separated using a gas separation membrane.

BACKGROUND

Separation and concentration of gases using gas separation membranes is a method with more excellent energy efficiency and higher safety compared to distillation or high-pressure adsorption methods. Recently, methods using gas separation membranes to remove and recover carbon dioxide, a greenhouse gas, from synthetic gas, natural gas or the like are also being actively studied (see PTLs 1, 2 and 3, for example).

Gas separation membranes are commonly in a form having a construction in which a gas separation active layer having gas separative power is situated on the surface of a porous support. Such a form is effective for imparting a certain degree of strength to the gas separation active layer while increasing the amount of gas permeation. The separation layer in this case is usually a layer containing a non-porous polymer.

The performance of a gas separation membrane is usually represented by the indices of permeation rate and separation factor. The permeation rate is represented as: (permeability coefficient of gas)/(thickness of separation layer). As evident from this formula, measures for obtaining a membrane with a high permeation rate include reducing the thickness of the gas separation active layer (see PTLs 4 and 5, for example), and increasing the permeability coefficient of the gas. That is, in order to obtain efficient membrane processing it is important to use a material with a large permeability coefficient and separation factor, and to reduce its thickness to a minimum. The separation factor is a value represented by the ratio of the permeation rates of the two gases that are to be separated, and this depends on the gas separating polymer composing the gas separation membrane.

The structure of the gas separation membrane is usually an asymmetric structure with a gas separation active layer having gas separative power layered on a porous support. The porous support has no ability to separate gases, but functions as a support to bear the gas separation active layer which does have gas separative power. The thickness of the gas separation active layer is on the micron order. Further thickness reduction of the gas separation active layer increases the productivity per module and is significant from the viewpoint of rendering the separating equipment more compact.

The olefin separating membrane is a membrane that separates olefin components such as ethylene, propylene, 1-butene, 2-butene, isobutene and butadiene from a mixed gas containing two or more gas components. Such a mixed gas includes, in addition to olefins, also mainly paraffins such as ethane, propane, butane and isobutane, and carbon dioxide. Since olefins and paraffins in a mixed gas have similar molecular sizes, the separation factor is generally small in a dissolution and diffusion separation mechanism. However, it is known that since olefins have affinity for silver ions and copper ions, with which they form complexes, olefins can be separated from mixed gases by an accelerated transport permeation mechanism utilizing that complex formation.

An accelerated transport permeation mechanism is a separation mechanism utilizing the affinity between a gas and a membrane for the purpose of separation. The membrane itself may have affinity, or the membrane may be doped with a component having affinity.

It is common for an accelerated transport permeation mechanism to yield a higher separation factor than a dissolution and diffusion separation mechanism. In an accelerated transport permeation mechanism for separation of an olefin, a metal ion is necessary to produce affinity with the olefin, and therefore the gas separation active layer must include water and an ionic liquid, the gas separation active layer usually being in the form of a gel membrane.

For carbon dioxide separating membranes as well, which separate carbon dioxide from mixed gases, techniques are known for separating carbon dioxide by an accelerated transport permeation mechanism, similar to an olefin separating membrane. Carbon dioxide generally has affinity for amino groups, and this separation technique utilizes that affinity. Such a separating membrane also usually includes water and an ionic liquid in the membrane, and the gas separation active layer is usually in the form a gel membrane.

In an accelerated transport permeation mechanism, when the amount of moisture in the gas separation active layer decreases, it becomes no longer possible to maintain affinity with the desired gas components such as olefins or carbon dioxide, and the permeability of the desired gas component is notably reduced. In a gas separation apparatus, therefore, it is important to maintain a state that includes moisture, in order to maintain the performance of the gas separation active layer.

However, technology allowing moisture to be adequately maintained has not yet been developed.

CITATION LIST

Patent Literature

[PTL 1] International Patent Publication No. WO2014/157069
[PTL 2] Japanese Unexamined Patent Publication No. 2011-161387
[PTL 3] Japanese Unexamined Patent Publication HEI No. 9-898
[PTL 4] Japanese Patent Publication No. 5507079
[PTL 5] Japanese Patent Publication No. 5019502

SUMMARY

Technical Problem

As mentioned above, since the gas separation active layer in an accelerated transport permeation mechanism usually requires moisture, it is necessary to hold water in the gas separation active layer using water vapor or the like in the source gas. However, due to the extremely rapid permeation rate of water, there is a limit to how uniformly water can be held in a gas separation active layer in a gas separation apparatus. That is, because it is difficult to maintain permeability in a membrane with low moisture, there have been limitations to effective utilization of the membrane area of gas separation active layers.

The present invention has been devised in light of these circumstances of the prior art, and it is an object of the invention to provide a module for gas separation that can uniformly and continuously hold water in the gas separation active layer for long periods.

Solution to Problem

The present inventors have conducted diligent research with the goal of solving the problem described above. As a result it was found that the problem can be solved by a module for gas separation in which a composite hollow fiber membrane having a gas separation active layer is disposed in the interior, the module being filled with an absorbing solution for a gas component to be separated that is present in a source gas, on the outer side of the composite hollow fiber membrane, and containing moisture in a feed gas for gas separation recovery, on the inner side of the composite hollow fiber membrane, and the present invention has thereupon been completed.

Specifically, the present invention provides the following.

[1]

A module for gas separation having a gas separation membrane disposed in the interior of an exterior body, wherein the module has a first space enclosed by the outer side of the gas separation membrane and the exterior body and a second space on the inner side of the gas separation membrane, the first space and second space being separated by the gas separation membrane and exterior body, and the first space is filled with an absorbing solution selected from the group consisting of water, and liquids or ionic liquids including at least one compound selected from the group consisting of amines, amino acids, carbonates, silver salts and copper salts.

[2]

The module for gas separation according to [1], wherein the gas separation membrane is a hollow fiber membrane having a porous hollow fiber support and a gas separation active layer situated on the surface of the hollow fiber support.

[3]

The module for gas separation according to [1] or [2], wherein the exterior body has a supply port and a discharge port for a first gas that passes through the first space, and a supply port and a discharge port for a second gas that passes through the second space.

[4]

The module for gas separation according to any one of [1] to [3], which has a draft tube between the exterior body and the gas separation membrane.

[5]

The module for gas separation according to any one of [2] to [4], wherein the hollow fiber membrane is a composite hollow fiber membrane having a porous hollow fiber support and a gas separation active layer situated on the surface of the hollow fiber support.

[6]

The module for gas separation according to any one of [1] to [5], wherein the first gas is a mixed gas including the gas component to be separated, and the second gas is a feed gas that is to recover the separated gas.

[7]

The module for gas separation according to any one of [1] to [6], wherein moisture is present in the second space.

[8]

The module for gas separation according to [7], wherein the moisture content is 0.1% or higher and 5.0% or lower.

[9]

The module for gas separation according to any of [3] to [8], wherein the discharge port and supply port for the first gas are connected.

[10]

The module for gas separation according to [9], wherein the absorbing solution circulates through the discharge port and supply port.

[11]

The module for gas separation according to any one of [2] to [10], wherein the gas separation active layer is composed mainly of a polymer gel, and the thickness of the layer is 10 nm or greater and 10 µm or smaller.

[12]

The module for gas separation according to [11], wherein the polymer gel is chitosan.

[13]

The module for gas separation according to any one of [2] to [12], wherein the porous hollow fiber support is composed mainly of polyethersulfone or polyvinylidene fluoride.

[14]

The module for gas separation according to any one of [2] to [13], which has partitions that adhesively anchor both ends of the hollow fiber membrane to the exterior body while separating the first space and the second space, the partitions being made of an epoxy resin obtained by curing a composition containing a compound with an epoxy group as the base compound and a compound with an acid anhydride group as a curing agent.

[15]

The module for gas separation according to any one of [1] to [14], wherein the first space is filled with an absorbing solution composed mainly of an aqueous solution including at least one metal salt selected from the group consisting of silver salts and copper salts, and the gas separation layer also contains the same metal salt as the absorbing solution.

[16]

The module for gas separation according to any one of [1] to [14], wherein the percentage of the first space occupied by the absorbing solution is 5 to 99 vol %.

[17]

The module for gas separation according to any one of [1] to [15], wherein the silver salt or copper salt in the absorbing solution filling the first space is 5 wt % to 90 wt % with respect to the total weight of the water.

[18]

The module for gas separation according to any one of [1] to [17], wherein the pressure conditions in the first space are 0.1 to 2.5 MPaG.

[19]

The module for gas separation according to any one of [1] to [18], wherein the moisture content of the second gas is 0.1 to 99%.

[20]

The module for gas separation according to any one of [1] to [19], wherein the content of inert gas in the second gas is 0.1 to 99%.

[21]

A gas separation method in which a module for gas separation according to any one of [1] to [20] is used to separate a gas to be separated from a mixed gas, the method being carried out under conditions in which the partial pressure of the gas to be separated in the first gas is higher than the partial pressure of the gas to be separated in the second gas.

[22]

A gas separation method in which moisture in a gas separated by the gas separation method according to [21] is separated by dehydrating equipment.

[23]

The gas separation method according to [21] or [22], wherein the first gas is an olefin and/or carbon dioxide.

[24]

The gas separation method according to [23], wherein the olefin contains any one of ethylene, propylene, isobutene, butene or butadiene.

[25]

The gas separation method according to [23], wherein the olefin is a bio-olefin.

[26]

The gas separation method according to [23] or [24], wherein the olefin content of the gas after separation of moisture by the dehydrating equipment is 99.99% or greater, and the paraffin content is 0.1 to 100 ppm.

[27]

The gas separation method according to any of [21] to [26], which produces olefin gas having a propane content of 0.1 to 50 ppm and a purity of 99.995% or greater.

[28]

An olefin gas having a propane content of 0.1 to 50 ppm and a purity of 99.995% or greater.

[29]

An olefin gas having an oxygen content of 0.1 to 5 ppm and a purity of 99.995% or greater.

[30]

An olefin gas having a carbon dioxide content of 0.1 to 5 ppm and a purity of 99.995% or greater.

[31]

The gas separation method according to any one of [23] to [27], wherein the olefin is produced from a fermentation gas.

Advantageous Effects of Invention

According to the invention there is provided a module for gas separation that has a high permeation rate and high separation performance for gases to be separated, and that uniformly retains moisture in the gas separation active layer continuously for long periods, and as a result, can maintain high separation performance for prolonged periods.

DESCRIPTION OF EMBODIMENTS

Embodiments of the invention will now be explained in greater detail with reference to the accompanying drawings.

[Source Gas (First Gas)]

The source gas (first gas) of the invention is a mixed gas of two or more gas components including the gas component to be separated. The gas component to be separated is separated from the mixed gas by being absorbed into an absorbing solution.

Examples for the gas component to be separated include carbon dioxide, methane, ethane, ethylene, propane, propylene, butane, and olefin gases such as 1-butene, 2-butene, isobutane, isobutene and butadiene. An olefin gas is a hydrocarbon gas having a double bond. An olefin gas may also be a bio-olefin gas synthesized using mainly a polysaccharide as the starting material. The olefin gas may also be produced from a fermentation gas.

The gas separation membrane of the invention may be a flat membrane or a hollow fiber membrane.

The module for gas separation 1 of the invention preferably comprises composite hollow fiber membranes 4, each having a porous hollow fiber support 2 and a gas separation active layer 3 situated on the surface of the porous hollow fiber support 2, disposed in the interior of an exterior body 5.

Figure 1:
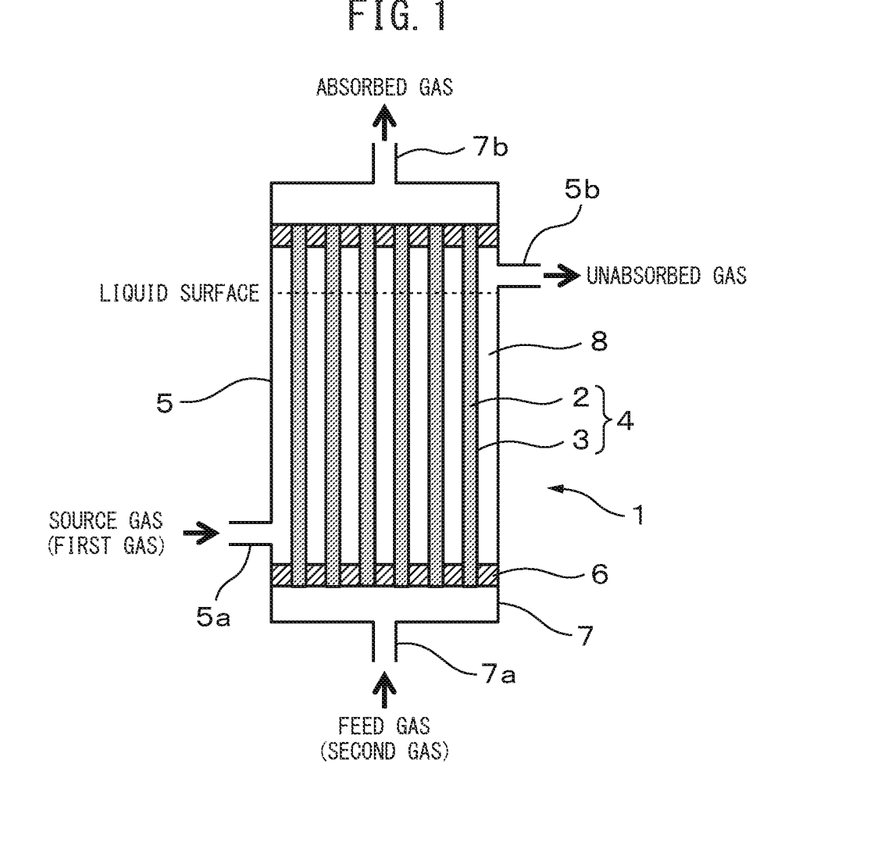
FIG. 1 is a diagram showing the general construction of a module for gas separation according to an embodiment of the invention.

As shown in FIG. 1, the module for gas separation 1 comprises a plurality of composite hollow fiber membranes 4, a tubular exterior body 5 housing the composite hollow fiber membranes 4 and partitions 6 (adhesive anchoring members) that adhesively anchor both ends of each of the composite hollow fiber membranes 4 to the exterior body 5. The partitions 6 define the regions where the openings of the composite hollow fiber membranes 4 are exposed (second spaces) and the region enclosed by the outer sides of the composite hollow fiber membranes 4 and the exterior body 5 (first space).

In the tubular exterior body 5 there are provided a supply port 5a that supplies a source gas (first gas) and a discharge port 5b that discharges treated gas, after the desired gas component has been separated from the source gas, the supply port 5a and discharge port 5b being provided in a manner protruding to the outer side from the side surface of the exterior body 5. The source gas (first gas) is supplied between the outer sides of the composite hollow fiber membranes 4 and the exterior body 5 (first space).

The partitions 6 and the header sections 7 are situated at both ends of the exterior body 5, sealing the composite hollow fiber membranes 4 inside the exterior body 5. At the header sections 7 there are provided, respectively, a supply port 7a that supplies a feed gas (second gas) for absorption of the separating gas to the inner sides of the composite hollow fiber membranes 4, and a discharge port 7b for discharge of the feed gas. The feed gas (second gas) used is a different gas from the source gas (first gas), and the feed gas (second gas) is supplied to the inner sides of the composite hollow fiber membranes 4 (second spaces). A vacuum pump may also be provided for transport of the absorbed gas downstream from 7b.

Figure 3:
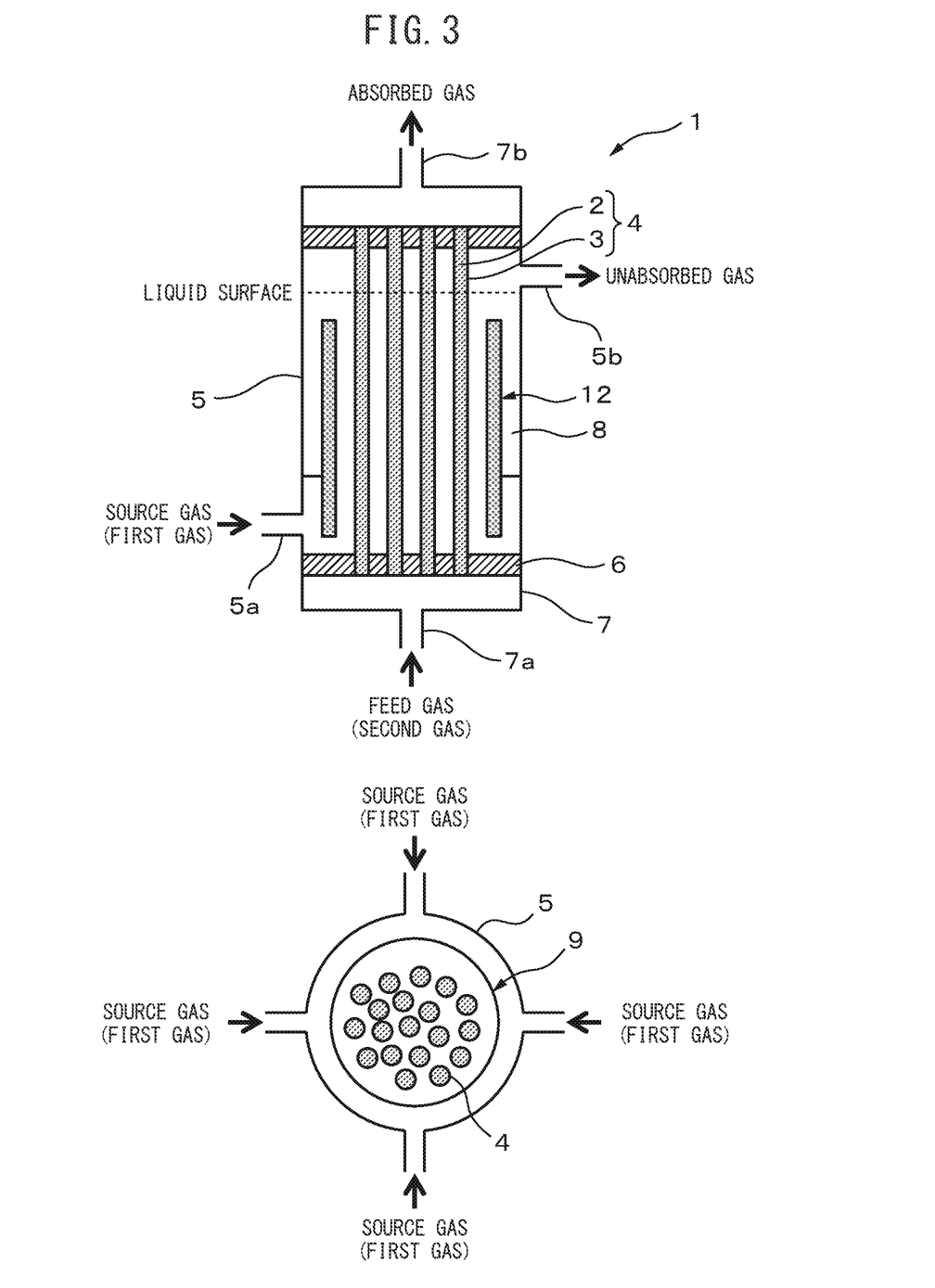
FIG. 3 is a diagram showing the general construction of a module for gas separation according to an embodiment of the invention.

As shown in FIG. 3, the module for gas separation 1 may have draft tubes 12 situated between the exterior body 5 and the composite hollow fiber membranes 4. The number of supply ports for the first gas as the source gas may be one, but there is no restriction on the number, with 4 or more being preferred however, when draft tubes 12 are provided. When the source gas is fed to the module for gas separation 1, the gas is blown in toward the draft tubes 12 and moves to the liquid surface without contacting with the composite hollow fiber membranes. Since a concentration difference is produced on the outer sides and inner sides of the draft tubes 12, liquid circulation is generated inside the module for gas separation, and olefin gas absorbed into the liquid during circulation is taken up into the composite hollow fiber membranes 4.

The draft tubes 12 used for the invention are tubes that have been imparted with a function of agitating the absorbing solution in the module for gas separation 1.

The draft tubes 12 are in partial anchored contact with the exterior body or the partitions 6. Also, the bottom sides of the draft tubes 12 are situated so as to be at a lower location than the supply port 5a for the source gas. This will allow a density difference to be efficiently created inside the absorbing solution, without the source gas being directly taken up into the composite hollow fiber membranes 4.

The top sides of the draft tubes 12 must also be lower than the liquid surface of the absorbing solution. By configuring the draft tubes 12 in this manner, it is possible to cause the absorbing solution of the module for gas separation 1 to circulate inside the module.

The shapes of the draft tubes 12 may be circular or polygonal. The shapes are not important so long as the structure is such that it imparts a function of generating liquid circulation inside the module.

The material for the draft tubes 12 is preferably a material that is not degraded by the feed gas and the liquid in the inside the module. Stainless steel, glass and zirconium are preferred. The thickness of the draft tubes is preferably 10 μm to 1 cm, with 50 μm to 5 mm being more desirable.

[Porous Hollow Fiber Support]

The porous hollow fiber supports 2 for the gas separation membrane of this embodiment are hollow fiber supports made of a membrane having a plurality of fine pores running through and connecting the front and back of each membrane. The porous hollow fiber supports 2 exhibit essentially no gas separation performance, but they can impart mechanical strength to the gas separation membrane of this embodiment.

The material of which the porous hollow fiber supports 2 are formed is not particularly restricted so long as it has sufficient corrosion resistance against the source gas and absorbing solution 8 and sufficient durability at the operating temperature and operating pressure, but preferred organic materials are homopolymers or copolymers such as polyethersulfone, polyvinylidene fluoride, PTFE, polyimide, polybenzooxazole and polybenzimidazole, any one of which may be used alone or as mixtures.

The inner diameters of the porous hollow fiber supports 2 are appropriately selected depending on the throughput of the source gas, but they will generally be selected between 0.1 mm and 20 mm. In order to increase contactability between the absorbing solution 8 and the gas component to be separated which is present in the source gas, the inner diameters of the porous hollow fiber supports 2 are preferably 0.2 mm to 15 mm. The outer diameters of the hollow fibers are not particularly restricted, and they may be appropriately selected to have thickness that can withstand differential pressure outside and inside the hollow fibers, depending on the inner diameters of the porous hollow fiber supports 2.

[Gas Separation Active Layer]

As mentioned above, the gas separation active layers 3 must include a metal ion in order to produce affinity with the gas component to be separated, and therefore the gas separation active layers 3 are preferably in the form of gel membranes (polymer gel membranes) containing water and an ionic liquid.

The thicknesses of the gas separation active layers 3 are preferably small, and will generally be selected between 10 nm and 100 μm. In order to increase the recovery speed of the desired gas component that is present in the source gas, the thicknesses of the gas separation active layers 3 are preferably 10 nm to 10 μm.

The material of the gas separation active layers 3 may be, for example, polyvinyl alcohol, polyacrylic acid, poly(1-hydroxy-2-propyl acrylate), polyethylene oxide-modified phosphoric acid methacrylate, polyallylsulfonic acid, polyvinylsulfonic acid, polyacrylamidemethylpropanesulfonic acid, polyethyleneimine, polyallylamine, gelatin, polylysine, polyglutamic acid, polyarginine, polyglycidyl methacrylate, poly(1-hydroxy-2-propyl acrylate) or polyethylene oxide-modified phosphoric acid methacrylate.

The polymer gel membrane may also include a polysaccharide. A polysaccharide, for the purpose of the present specification, is a polymer having a structure in which a monosaccharide is bonded by a glycoside bond, and the concept encompasses oligosaccharides. The number of repeating units of the polysaccharide is preferably 100 to 10,000, more preferably 300 to 7,000 and even more preferably 500 to 4,000.

Examples of polysaccharides include chitosan, alginic acid, pectin, chondroitin, hyaluronic acid, xanthan gum, cellulose, chitin, pullulan, oligoglucosamine and oligofructose, as well as their derivatives. These polysaccharides may be used alone or in admixture.

The composite hollow fiber membranes 4 were described above, but a specific metal salt may also be added to the porous hollow fiber supports 2 and the gas separation active layers 3 that are the main constituents of the composite hollow fiber membranes 4, in order to improve the gas separation performance. From the viewpoint of improving gas separation performance, the gas separation active layers 3 preferably contain the same metal salt as the absorbing solution.

The metal salt is preferably a salt consisting of a cation selected from the group consisting of monovalent silver ions, monovalent copper ions and their complex ions, and an anion selected from the group consisting of $F^-$, $Cl^-$, $Br^-$, $I^-$, $CN^-$, $NO_3^-$, $SCN^-$, $ClO_4^-$, $CF_3SO_3^-$, $BF_4^-$ and $PF_6^-$, and their mixtures. Of these, $Ag(NO_3)$ is especially preferred from the viewpoint of ready availability and product cost.

The content of the metal salt is preferably 5 wt % to 90 wt % and more preferably 10 wt % to 80 wt % with respect to the total weight of the metal salt and water.

[Exterior Body]

The exterior body 5 in which the composite hollow fiber membranes 4 are disposed will now be described.

The exterior body 5 may have any construction and shape so long the composite hollow fiber membranes 4 can be disposed inside it, but the example used here is of a cylindrical exterior body 5.

The cylindrical exterior body 5 is mainly constructed with a cylindrical portion having a cylindrical shape open at one or both ends for insertion of the composite hollow fiber membranes 4, and partitions 6 and header sections 7 for sealing after insertion of the composite hollow fiber membranes 4.

[Cylindrical Portion]

The cylindrical portion serves to internally house the composite hollow fiber membranes 4 and isolate them from the exterior, and the material of the cylindrical portion is not particularly restricted so long as it has sufficient corrosion resistance and durability against the source gas, absorbing solution 8 and pressure, and may be a metal material, inorganic material or organic material, or a composite material of the same.

The cylindrical portion has at least a supply port 5a that supplies the source gas (first gas) and a discharge port 5b that discharges the treated gas after the desired gas has been separated from the source gas. A plurality of supply ports 5a may also be provided.

[Partitions]

The partitions 6 serve to expose the open ends of the composite hollow fiber membranes 4 disposed inside the cylindrical portion while sealing the composite hollow fiber membranes 4 in the interior of the cylindrical portion, and such a construction separates the inner sides of the composite hollow fiber membranes 4 from the outer sides of the composite hollow fiber membranes 4.

The partitions 6 of the module for gas separation 1 of this embodiment are adhesive materials that join the composite hollow fiber membranes 4 to the exterior body 5. The partitions 6 are separating members serving to avoid mixing of the first gas and second gas, while also being adhesive anchoring members that anchor the composite hollow fiber membranes 4 to the exterior body 5.

The material of the partitions 6 is not particularly restricted so long as it has sufficient corrosion resistance against the source gas and absorbing solution and sufficient durability against the operating temperature and operating pressure, but usually an organic material such as a urethane resin, epoxy resin, silicone resin, vinyl acetate resin or acrylic resin may be used, with epoxy resins being preferred.

According to the invention, the partitions 6 must be durable against the absorbing solution 8 since they will directly contact with the absorbing solution 8. For this purpose, the members forming the partitions 6 of the invention are durable against the absorbing solution 8. The durability of epoxy resins is more preferred.

The epoxy resin is obtained by mixing and curing a base compound comprising a compound with an epoxy group, and a curing agent. It may also include a curing accelerator.

Epoxy resin thermosetting agents include amines, polyaminoamides, phenols and acid anhydrides, with acid anhydrides being more preferred for use.

Examples of acid anhydrides include aliphatic acid anhydrides such as methyl-5-norbornane-2,3-dicarboxylic anhydride (methylnadic anhydride), dodecenylsuccinic anhydride, polyadipic anhydride, polyazelaic anhydride, polysebacic anhydride, poly(ethyloctadecanedioic acid) anhydride and poly(phenylhexadecanedioic acid) anhydride, alicyclic acid anhydrides such as methyltetrahydrophthalic anhydride, methylhexahydrophthalic anhydride, methylhymic anhydride, hexahydrophthalic anhydride, trialkyltetrahydrophthalic anhydride and methylcyclohexenedicarboxylic anhydride, or aromatic acid anhydrides such as phthalic anhydride, trimellitic anhydride, pyromellitic anhydride, benzophenonetetracarboxylic anhydride, ethyleneglycol bis trimellitate and glycerol tris trimellitate, any of which may be used alone or in admixture.

Common compounds such as tertiary amines including tris(dimethylaminomethyl)phenol, 1,8-diazabicyclo[5,4,0]undecene-7 (DBU), 1,5-diazabicyclo[4.3.0]nonene-5 (DBN) and 1,4-diazabicyclo[2.2.2]octane (DABCO), imidazoles, Lewis acids and Bronsted acids may be mentioned as epoxy resin curing accelerators, any of which may be used alone or in admixture.

The epoxy-based adhesive may also include various additives as necessary, such as fillers, age inhibitors and reinforcing agents.

[Draft Tubes]

The draft tubes 12 are imparted with a function of agitating the absorbing solution in the module for gas separation 1. By creating a density difference of the liquid inside and outside of the draft tubes 12, the absorbing solution is agitated and the olefin gas is efficiently taken up into the composite hollow fiber membranes 4.

The draft tubes 12 are in partial anchored contact with the exterior body or the partitions 6. Also, the bottom sides of the draft tubes 12 are situated at a lower location than the supply port 5a for the source gas. This will allow a density difference to be efficiently created inside the absorbing solution, without the source gas being directly taken up into the composite hollow fiber membranes 4.

The top sides of the draft tubes 12 must also be lower than the liquid surface of the absorbing solution. By configuring the draft tubes 12 in this manner, it is possible to cause the absorbing solution of the module for gas separation 1 to circulate inside the module. The shapes of the draft tubes may be circular or polygonal. The shapes are not important so long as the structure is one that imparts a function of generating liquid circulation inside the module.

The material for the draft tubes is preferably a material that is not degraded by the feed gas and the liquid in the inside the module. Stainless steel, glass and zirconium are preferred. The thickness of the draft tubes is preferably 10 $\mu$m to 1 cm, with 50 $\mu$m to 5 mm being more desirable.

The module for gas separation 1 having the composite hollow fiber membranes 4 disposed inside the exterior body 5 as described above, due to its structure, allows supply of the source gas (first gas) between the outer sides of the composite hollow fiber membranes 4 and the exterior body 5 (first space) through the supply port 5a, and discharge of the treated gas through the discharge port 5b. It also has a structure that allows a feed gas (second gas) for absorption of the separating gas, which is different from the source gas (first gas), to be supplied to the inner sides of the composite hollow fiber membranes 4 (second spaces) through the supply port 7a, and discharged through the discharge port 7b. The supply and discharge of the second gas may be carried out through each of the composite hollow fiber membranes 4 one at a time, or through some of them at once, or through all of the composite hollow fiber membranes at once, although it is more efficient to carry it out through all of them at once (FIG. 1).

[Absorbing Solution]

The absorbing solution 8 is a liquid absorbent capable of absorbing the gas component to be separated that is present in the source gas, and it includes absorbents that cause absorption and dissipation by reversible reaction with the gas component to be separated, or that cause chemical or physical absorption and dissipation. The absorbing solution 8 is selected from among known chemical absorbing solutions, chemical absorbents, physical absorbing solutions and physical absorbents.

The absorbing solution 8 is preferably filled in the space through which the first gas passes (the first space), between the composite hollow fiber membranes 4 and the exterior body 5 of the module for gas separation 1. However, as shown in FIG. 1, the absorbing solution 8 is filled without exceeding the height of the discharge port 5b for the unabsorbed gas after treatment.

The filling volume of the absorbing solution 8 is 5 vol % to 99 vol %, preferably 20 vol % to 95 vol % and most preferably 25 vol % to 90 vol % of the first space.

In order to cause sufficient uptake of the gas component to be separated into the absorbing solution, the volume percentage is preferably 25 vol % or greater, and in order to efficiently maintain the flow rate of the first gas, it is preferably no greater than 90 vol %.

The type of absorbing solution 8 will differ depending on the type of gas to be separated.

For example, when the gas component to be separated is carbon dioxide, examples of chemical absorbing solutions (or absorbents) include amine absorbing solutions of monoethanolamine, diethanolamine, triethanolamine, diisopropylamine or methyldiethanolamine, amino acid aqueous solutions of glycine or 2,3-diaminopropionic acid, carbonate aqueous solutions or molten salts of potassium carbonate or the like, and ionic liquids of imidazolium-based compounds or pyridinium-based compounds.

When the desired gas component is an acidic gas such as carbon dioxide, a physical absorbing solution (or adsorbent) may be polyethylene glycol, dimethyl ether, methanol, N-methyl-2-pyrrolidone, propylene carbonate, water or the like.

When the desired gas component is an olefin, examples of absorbing solutions (or adsorbents) include metal salt aqueous solutions, solutions of polyethylene glycol or the like, or cuprous chloride aqueous solutions, and ionic liquids of imidazolium-based compounds or pyridinium-based compounds, among which metal salts are preferred.

The metal salt is preferably a salt consisting of a cation selected from the group consisting of monovalent silver ions, monovalent copper ions and their complex ions, and an anion selected from the group consisting of $F^-$, $Cl^-$, $Br^-$, $I^-$, $CN^-$, $NO_3^-$, $SCN^-$, $ClO_4^-$, $CF_3SO_3^-$, $BF_4^-$ and $PF_6^-$, and their mixtures. Of these, $Ag(NO_3)$ is especially preferred from the viewpoint of ready availability and product cost.

The concentration of the metal salt in the absorbing solution of the invention is preferably 10 mass % to 90 mass %, more preferably 30 mass % to 80 mass % and even more preferably 35 mass % to 75 mass %, with respect to the total mass of the water and metal salt. When a silver salt or copper salt is used, it is preferably 5 mass % to 90 mass % with respect to the total weight of the water.

As mentioned above, these metal salts may be included in the gas separation active layers 3, while also being included in the porous hollow fiber supports 2.

Including such metal salts in both the absorbing solution 8 and composite hollow fiber membranes 4 will increase the gas separation performance.

[Feed Gas for Absorption of the Separating Gas (Second Gas)]

The feed gas for absorption of the separating gas (second gas), which is to recover the gas to be separated that has passed through the composite hollow fiber membranes 4 and been separated from the source gas (first gas), will now be described.

The second gas may be composed entirely of the separated gas, but in order to sufficiently retain moisture in the gas separation active layers 3 and maintain gas separation activity, the second gas used is preferably a feed gas that is different from the first gas that is to be separated.

The feed gas is preferably water vapor or an inert gas including water vapor. The moisture content and inert gas content of the second gas is preferably 0.1 to 99%, more preferably 10 to 99% and even more preferably 20 to 99%. The second gas itself may also include moisture, or moisture may be present in the second space. In this case, the moisture content in the second space is 0.1% or higher and 5.0% or lower.

Moisture is also separated from the separated gas if necessary, using prescribed dehydrating equipment. Preferably, the olefin content of the gas after separation of moisture by the dehydrating equipment is 99.99% or greater and the paraffin content is 0.1 to 100 ppm.

[Purified Gas]

Olefin gases such as propylene gas, as purified gases, can reportedly be utilized as starting materials for synthesis of acrylonitrile if their purity is 90 to 99%, and can reportedly be utilized as starting materials for synthesis of polypropylene if their purity is 99.5% or higher. Propylene with a high purity of about 99.99% can reportedly be utilized as a carbon source for an amorphous carbon layer, for manufacture of semiconductor memory. However, high-purity propylene that is actually used at the current time does not give a sufficient yield of amorphous carbon layer for memory manufacturing.

The present inventors therefore conducted research to discover the reason why a sufficient amorphous carbon layer yield is not obtained despite high purity, focusing on the concentration of propane, oxygen and carbon dioxide in high-purity propylene. As a result of this research, it was found that the amorphous carbon layer yield increases if the propane content in high-purity propylene can be controlled to 1 ppm to 50 ppm and the oxygen concentration and carbon dioxide concentration can be controlled to 0.1 ppm to 5 ppm.

When the propane concentration in high-purity propylene is 50 ppm or lower, the amorphous carbon layer yield tends to increase, while conversely if the propane content is lower than 1 ppm the amorphous carbon layer strength tends to vary, requiring more time for etching of the amorphous carbon layer, and therefore a propane content of 0.1 ppm or greater may be considered optimal for the etching step.

The same trend was found for oxygen and carbon dioxide as well. When the oxygen or carbon dioxide concentration in high-purity propylene is 5 ppm or lower, the amorphous carbon layer yield tends to increase, while conversely if the oxygen or carbon dioxide content is lower than 0.1 ppm the amorphous carbon layer strength tends to vary, requiring more time for etching of the amorphous carbon layer, and therefore an oxygen or carbon dioxide content of 0.1 ppm or greater may be considered optimal for the etching step.

In other words, the concentration of propane as the carbon source of an amorphous carbon layer for semiconductor memory manufacturing is preferably 0.1 ppm or greater as the lower limit and no greater than 50 ppm as the upper limit. Moreover, the oxygen concentration and carbon dioxide concentration during production of an amorphous carbon layer for semiconductor memory manufacturing are preferably 0.1 ppm or greater as the lower limit and no greater than 5 ppm as the upper limit. Also, the propylene concentration is preferably 99.995% or greater as the lower limit and no greater than 99.9999% as the upper limit.

The module for gas separation 1 of the invention may have a permeability coefficient of 100 Barrer or greater and 2,000 Barrer or smaller for propylene gas and a propylene/propane separation factor α of 50 or greater and 2,000 or smaller, under conditions with a measuring temperature of 30° C. and a propylene partial pressure of 0.6 atmosphere.

The pressure of the source gas fed to the gas separation module (the pressurization conditions in the first space) is preferably 0.1 to 2.5 MPaG, more preferably 0.1 to 2.0 MPaG and even more preferably 0.1 to 1.5 MPaG. At 0.1 MPaG or lower the permeation rate of the olefin gas that is recovered will not be sufficient, and at 2.5 MPaG or higher it will not be possible to maintain the durability of the gas separation membrane.

[Mechanism of Olefin Gas Separation by Module for Gas Separation 1]

The mechanism by which gas separation is efficiently carried out by the invention will now be explained.

In the module for gas separation 1 illustrated in FIG. 1, the source gas (first gas) supplied from the supply port 5a for the source gas contacts with the absorbing solution 8 that has been supplied between the inner surface of the exterior body 5 and the outer surfaces of the composite hollow fiber membranes 4 (first space). Mass transfer of the gas component to be separated is promoted, resulting in dissolution in the absorbing solution 8 in a short period of time. This is because the metal salt in the absorbing solution 8 is in ion form in the presence of water, and it rapidly forms a complex with the olefin in the source gas.

Although the membrane permeation rate of water molecules is extremely high, the gas separation active layers 3 do not dry because the interior of the module for gas separation 1 is filled with water (absorbing solution 8). In other words, the conventional behavior in which the membranes dry, significantly lowering the permeation rate, is not observed with the present invention.

The gas component to be separated that has dissolved in the absorbing solution 8 increases in concentration in the absorbing solution 8. The partial pressure ratio of the olefin and other gases in the absorbing solution (olefin/other gases) is increased above that in the source gas. Moreover, since the olefin gas that has dissolved in the absorbing solution experiences accelerated mass transfer into the composite hollow fiber membranes 4, which have low olefin concentration, the desired component is separated through an absorbed gas discharge line (not shown) connected to the discharge port 7b. This is carried out with a higher partial pressure of the gas to be separated in the first gas than the partial pressure of the gas to be separated in the second gas.

The gas discharged from the absorbed gas discharge line (discharge port 7b) may also include an inert gas or water vapor. If it includes an inert gas, the difference between the gas partial pressure of the gas component to be separated inside the absorbing solution 8 and the partial pressure of the gas component to be separated in the absorbed gas line can be increased, allowing a high permeation rate to be continuously maintained. When an inert gas is used, however, a subsequent step is necessary to separate the olefin gas and the inert gas. For example, the gases can be easily separated by cooling to a temperature at which the olefin gas liquefies.

Supplying moisture into the absorbed gas line has the effect of retaining moisture inside the composite hollow fiber membranes 4, and is effective as a method of preventing reduction in the permeation rate due to lack of moisture retention. A subsequent separation step is necessary for this moisture as well. It can be easily separated using an absorptive material such as zeolite, for example. The source gas that has not been absorbed into the absorbing solution 8 is discharged from the module for gas separation 1 through the discharge port 5b as unabsorbed gas. The unabsorbed gas includes the unabsorbed portion of the desired component present in the source gas, as well as gas components other than the desired gas component.

Figure 2:
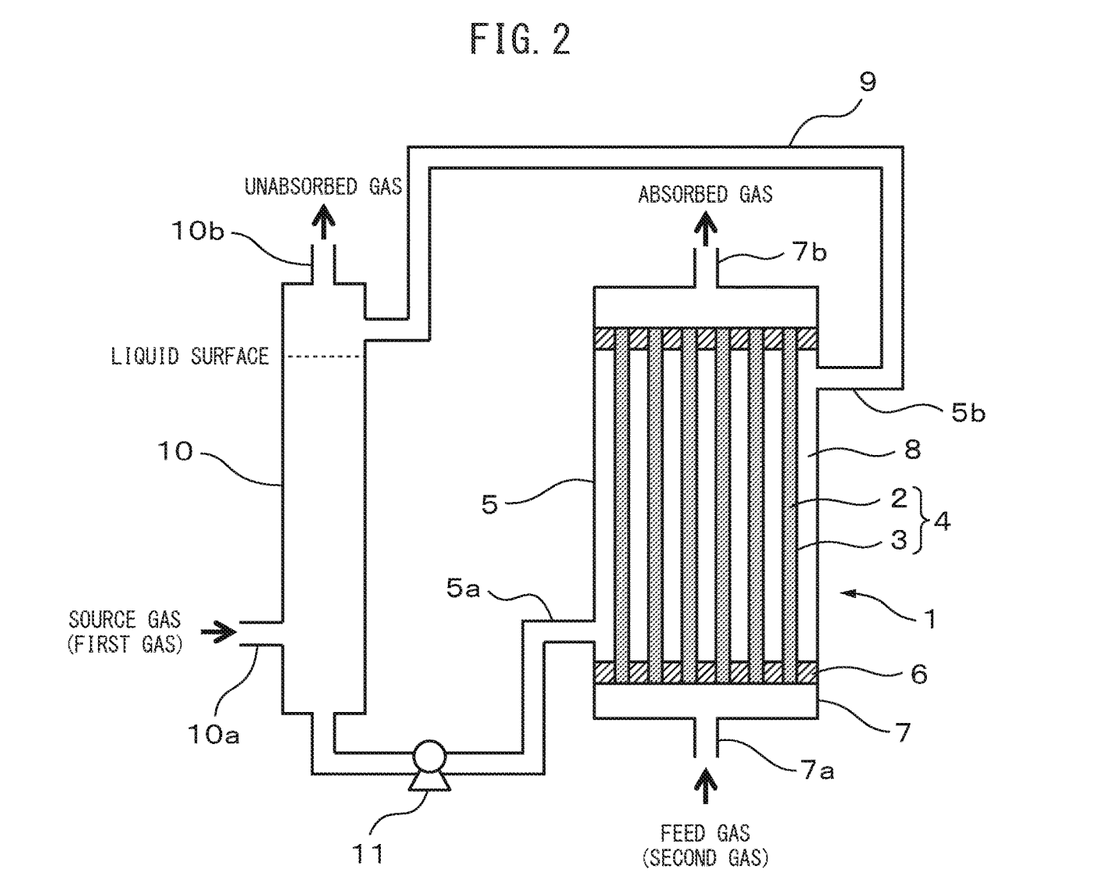
FIG. 2 is a diagram showing the general construction of a module for gas separation according to an embodiment of the invention.

Also, as shown in FIG. 2, in the module for gas separation of the invention, the discharge port 5b for the first gas is connected to the supply port 5a for the first gas via a circulation line 9 and a gas absorption tube 10. In addition, a circulating pump 11 situated within the circulation line 9 may be used to circulate the absorbing solution 8. This is effective as a method of reducing concentration polarization of gas in the absorbing solution 8, and allows the desired gas component to be recovered at a higher speed than the process of FIG. 1.

Furthermore, if draft tubes 12 are situated inside the module for gas separation 1 as shown in FIG. 3, then the agitating effect using the density difference inside the module can be increased, and as a result, it is possible to efficiently take up the olefin gas into the composite hollow fiber membranes 4.

As explained above, according to the present invention it is possible to provide a module for gas separation and a gas separation method that allow moisture to be continuously retained for long periods in gas separation active layers, and to thereby maintain high separation performance for prolonged periods.

EXAMPLES

The present invention will now be explained in further detail using working examples. However, it is to be understood that the invention is not limited in any way by these examples.

Example 1

A module for gas separation such as shown in FIG. 1 was fabricated.

For the hollow fiber supports, polyethersulfone (PES) hollow fiber membranes each having an inner diameter of 0.7 mm, an outer diameter of 1.2 mm and a length of 12 cm were immersed in a 0.5 wt % aqueous solution of chitosan and dried at 80° C. for 7 minutes after immersion, to coat the hollow fiber support surfaces with a chitosan layer as a gas separation active layer. Composite hollow fiber membranes were fabricated in this manner.

Ten of the composite hollow fiber membranes were placed in a cylindrical container having an inner diameter of 2 cm, and both ends of the container were adhesively sealed with an acid anhydride-based epoxy adhesive. The membrane area was 64 cm$^2$. After curing of the adhesive, 1 cm was cut from both ends of the cylinder. A 7 M silver nitrate aqueous solution was injected into the module for gas separation through a source gas supply line (supply port 5a) on the side of the cylindrical container, to fabricate a module for gas separation.

The module for gas separation was used for measurement of the permeation rates for propane and propylene.

A mixed gas comprising propane and propylene as the first gas (source gas) (propane:propylene=40:60 (mass ratio)) was used for the measurement, with a supply side gas flow rate of 50 cc/min and a nitrogen flow rate of 50 cc/min into the absorbed gas. The nitrogen gas as the second gas (feed gas) was supplied into the module for gas separation in a humidified atmosphere that had been bubbled through water before being supplied. The measuring temperature was 30° C. The pressure was 0 KPaG for both the first gas and second gas.

The gas component that permeated the module for gas separation was analyzed by gas chromatography (GC) 3 hours after supply of the source gas, and the propylene/propane separation factor α was determined.

The measurement results are shown in Table 1.

Example 2

Measurement of gas permeation was carried out by the same method as Example 1, except that instead of the humidified nitrogen gas in Example 1, dry nitrogen gas that had not been bubbled in water was used as the second gas.

The results are shown in Table 1.

Example 3

In Example 1, the unabsorbed gas line (discharge port 5b) and source gas line (supply port 5a) were connected via a circulating pump 11 and gas absorption tube 10 comprising a gas supply line 10*a* and a gas discharge line 10*b*. The process is shown in FIG. 2.

In FIG. 2, the source gas is supplied by a gas supply line 10*a* at the bottom end of the gas absorption tube 10, and the unabsorbed gas is discharged through the gas discharge line 10*b* at the top end of the gas absorption tube 10. The gas-dissolving absorbing solution 8 was ejected from the bottom of the gas absorption tube 10, and the solution alone was supplied to the module for gas separation 1 by the circulating pump 11. The supply solution is supplied into the module form the bottom of the module for gas separation 1 and extracted from the top, and then supplied to the top of the gas absorption tube 10.

The circulation rate of the absorbing solution was 30 cc/min.

The permeated gas component was analyzed by gas chromatography (GC) 3 hours after circulation of the absorbing solution.

The results are shown in Table 1.

Example 4

The permeation was measured by the same method as Example 3, except that the circulation time for the absorbing solution was 7 days.

The results are shown in Table 1.

Example 5

The permeation was measured by the same method as Example 3, except that a urethane adhesive was used instead of the acid anhydride-based epoxy adhesive.

The results are shown in Table 1.

Example 6

The permeation was measured by the same method as Example 4, except that a urethane adhesive was used instead of the acid anhydride-based epoxy adhesive.

The results are shown in Table 1.

Example 7

The permeation was measured by the same method as Example 3, except that the hollow fiber supports were polyvinylidene fluoride (PVDF) instead of PES.

The results are shown in Table 1.

Example 8

The permeation was measured by the same method as Example 4, except that the hollow fiber supports were PVDF instead of PES.

The results are shown in Table 1.

Example 9

The permeation was measured by the same method as Example 3, except that the hollow fiber supports were polysulfone (PSf) instead of PES.

The results are shown in Table 1.

Example 10

The permeation was measured by the same method as Example 4, except that the hollow fiber supports were PSf instead of PES.

The results are shown in Table 1.

Example 11

The permeation was measured by the same method as Example 1, except that the hollow fiber supports were polyvinylidene fluoride (PVDF) instead of PES.

The results are shown in Table 1.

Example 12

The permeation was measured by the same method as Example 11, except that the measuring time was 7 days.

The results are shown in Table 1.

Example 13

The permeation was measured by the same method as Example 1, except that the support was PVDF, a mixed gas comprising propane and propylene (propane:propylene:oxygen:carbon dioxide=0.49:99.5:0.005:0.005 (mass ratio)) was used as the first gas (source gas), the supply side gas flow rate was 50 cc/min and the nitrogen flow rate into the absorbed gas was 50 cc/min.

The results are shown in Table 1.

Example 14

The permeation was measured by the same method as Example 13, except that the measuring time was 7 days.

The results are shown in Table 1.

Example 15

A module for gas separation such as shown in FIG. 3 was fabricated.

For the hollow fiber supports, polyvinylidene fluoride (PVDF) hollow fiber membranes each having an inner diameter of 0.7 mm, an outer diameter of 1.2 mm and a length of 12 cm were immersed in a 0.5 wt % aqueous solution of chitosan and dried at 80° C. for 7 minutes after immersion, to coat the hollow fiber support surfaces with a chitosan layer as a gas separation active layer. Composite hollow fiber membranes were fabricated in this manner.

Thirty of the composite hollow fiber membranes were placed in a cylindrical container having an inner diameter of 3 cm, and both ends of the container were adhesively sealed with an acid anhydride-based epoxy adhesive. The membrane area was 192 cm$^2$. After curing the adhesive, the acid anhydride epoxy adhesive bonded to the hollow fibers was detached from the cylindrical container. It was then inserted into a container in which draft tubes 12 with inner diameters of 4 cm and an exterior body 5 with an inner diameter of 5.5 cm were partially connected, both ends were cured with an epoxy adhesive, and 1 cm was cut from both end surfaces. The exterior body 5 used had four source gas supply ports 5*a*. A 7 M silver nitrate aqueous solution was injected into the module to obtain a module for gas separation 1.

The module for gas separation was used for measurement of the permeation rates for propane and propylene.

A mixed gas comprising propane and propylene as the first gas (source gas) (propane:propylene:oxygen:carbon dioxide=0.49:99.5:0.005:0.005 (mass ratio)) was used for the measurement, with a supply side gas flow rate of 150 cc/min and a nitrogen flow rate of 200 cc/min into the absorbed gas. The nitrogen gas as the second gas (feed gas) was supplied into the module for gas separation in a humidified atmosphere that had been bubbled through water before being supplied. The measuring temperature was 30° C. The pressure was 0 KPaG for both the first gas and second gas.

The gas component that permeated the module for gas separation was analyzed by FID gas chromatography (FID-GC) 3 hours after supply of the source gas, and the propylene/propane separation factor α was determined.

The measurement results are shown in Table 1.

Example 16

The permeation was measured by the same method as Example 15, except that the measuring time was 7 days.
The results are shown in Table 1.

Example 17

The permeation was measured by the same method as Example 15, except that a mixed gas comprising carbon dioxide and butadiene (carbon dioxide:butadiene=65:35 (mass ratio)) was used as the first gas (source gas).
The results are shown in Table 1. The Flux values in the table indicate the butadiene permeation flow rates.

Example 18

The permeation was measured by the same method as Example 17, except that the measuring time was 7 days.

Example 19

The permeation was measured by the same method as Example 15, except that a mixed gas comprising carbon dioxide and butadiene (carbon dioxide:nitrogen=30:70 (mass ratio)) was used as the first gas (source gas), and the absorbing solution inside the module for gas separation 1 was monoethanolamine.
The results are shown in Table 1. The Flux values in the table indicate the carbon dioxide permeation flow rates.

Example 20

The permeation was measured by the same method as Example 19, except that the measuring time was 7 days.

Comparative Example 1

The permeation was measured by the same method as Example 2, except that the absorbing solution was held in the module for gas separation for 24 hours after being injected, after which the absorbing solution was discharged from the unabsorbed gas line (discharge port 5b) shown in FIG. 1.
The results are shown in Table 1.

Comparative Example 2

In Comparative Example 1, the source gas was supplied to the module for gas separation after having been bubbled in water. The permeation was measured by the same method, except that the nitrogen in the absorbed gas line was also supplied to the module for gas separation after having been bubbled in water.
The results are shown in Table 1.

Comparative Example 3

The permeation was measured by the same method as Comparative Example 2, except that the measuring time was 7 days.

Comparative Example 4

The permeation was measured by the same method as Example 1, except that the module for gas separation was assembled without coating the hollow fiber supports with chitosan.
The results are shown in Table 1.

Comparative Example 5

The permeation was measured by the same method as Comparative Example 1, except that the silver nitrate aqueous solution was not used.
The results are shown in Table 1.

Comparative Example 6

In Comparative Example 5, purified water was injected into the module for gas separation 1, and the source gas was supplied to the module for gas separation. The permeation was measured by the same method, except that the nitrogen in the absorbed gas line was supplied to the module for gas separation after having been bubbled in water.
The results are shown in Table 1.

TABLE 1

| | Support | Adhesive | Membrane area [cm$^2$] | Absorbing solution in module | Liquid circulation | Measurement or circulation time | First gas (source gas) Type |
|---|---|---|---|---|---|---|---|
| Example 1 | PES | Epoxy | 64 | Yes | No | 3 hours | Propane:propylene = 40:60 |
| Example 2 | PES | Epoxy | 64 | Yes | No | 3 hours | |
| Example 3 | PES | Epoxy | 64 | Yes | Yes | 3 hours | |
| Example 4 | PES | Epoxy | 64 | Yes | Yes | 7 days | |
| Example 5 | PES | Urethane | 64 | Yes | Yes | 3 hours | |
| Example 6 | PES | Urethane | 64 | Yes | Yes | 7 days | |
| Example 7 | PVDF | Epoxy | 64 | Yes | Yes | 3 hours | |
| Example 8 | PVDF | Epoxy | 64 | Yes | Yes | 7 days | |
| Example 9 | PSf | Epoxy | 64 | Yes | Yes | 3 hours | |
| Example 10 | PSf | Epoxy | 64 | Yes | Yes | 7 days | |
| Example 11 | PVDF | Epoxy | 64 | Yes | No | 3 hours | |
| Example 12 | PVDF | Epoxy | 64 | Yes | No | 7 days | |
| Example 13 | PVDF | Epoxy | 64 | Yes | No | 3 hours | Propane:propylene:O$_2$:CO$_2$ = 0.49:99.5:0.005:0.005 |
| Example 14 | PVDF | Epoxy | 64 | Yes | No | 7 days | |
| Example 15 | PVDF | Epoxy | 192 | Yes | No | 3 hours | |
| Example 16 | PVDF | Epoxy | 192 | Yes | No | 7 days | |

TABLE 1-continued

| | | | | | | | |
|---|---|---|---|---|---|---|---|
| Example 17 | PVDF | Epoxy | 192 | Yes | No | 3 hours | $CO_2$:butadiene = |
| Example 18 | PVDF | Epoxy | 192 | Yes | No | 7 days | 65:35 |
| Example 19 | PVDF | Epoxy | 192 | Yes | No | 3 hours | $CO_2$:$N_2$ = 30:70 |
| Example 20 | PVDF | Epoxy | 192 | Yes | No | 7 days | |
| Comp. Ex. 1 | PES | Epoxy | 64 | No | No | 3 hours | Propane:propylene = |
| Comp. Ex. 2 | PES | Epoxy | 64 | No | No | 3 hours | 40:60 |
| Comp. Ex. 3 | PES | Epoxy | 64 | No | No | 7 days | |
| Comp. Ex. 4 | PES | Epoxy | 64 | Yes | No | 3 hours | |
| Comp. Ex. 5 | PES | Epoxy | 64 | No | No | 3 hours | |
| Comp. Ex. 6 | PES | Epoxy | 64 | Yes | No | 3 hours | |

| | First gas (source gas) | | Second gas (Feed gas) | | | | |
|---|---|---|---|---|---|---|---|
| | Flow rate [cc/min] | Humidification | Type | Flow rate [cc/min] | Humidification | Flux [cc/min] | A |
| Example 1 | 50 | No | $N_2$ | 50 | Yes | 6.8 | >300 |
| Example 2 | 50 | No | | 50 | No | 6.0 | >300 |
| Example 3 | 50 | No | | 50 | Yes | 7.8 | >300 |
| Example 4 | 50 | No | | 50 | Yes | 7.8 | >300 |
| Example 5 | 50 | No | | 50 | Yes | 7.4 | >300 |
| Example 6 | 50 | No | | 50 | Yes | 7.8 | 162 |
| Example 7 | 50 | No | | 50 | Yes | 7.8 | >300 |
| Example 8 | 50 | No | | 50 | Yes | 7.8 | >300 |
| Example 9 | 50 | No | | 50 | Yes | 7.8 | >300 |
| Example 10 | 50 | No | | 50 | Yes | 2.1 | >300 |
| Example 11 | 50 | No | | 50 | Yes | 6.5 | >300 |
| Example 12 | 50 | No | | 50 | Yes | 6.5 | >300 |
| Example 13 | 50 | No | | 50 | Yes | 12.8 | 512 |
| Example 14 | 50 | No | | 50 | Yes | 12.9 | 509 |
| Example 15 | 150 | No | | 150 | Yes | 41 | 512 |
| Example 16 | 150 | No | | 150 | Yes | 40.5 | 509 |
| Example 17 | 150 | No | | 150 | Yes | 12.5 | 64 |
| Example 18 | 150 | No | | 150 | Yes | 13.2 | 62 |
| Example 19 | 150 | No | | 150 | Yes | 12 | 75 |
| Example 20 | 150 | No | | 150 | Yes | 11.9 | 80 |
| Comp. Ex. 1 | 50 | No | | 50 | No | Nd | Nd |
| Comp. Ex. 2 | 50 | Yes | | 50 | Yes | 5.1 | >300 |
| Comp. Ex. 3 | 50 | Yes | | 50 | Yes | 4.5 | >300 |
| Comp. Ex. 4 | 50 | No | | 50 | Yes | 7.9 | 23 |
| Comp. Ex. 5 | 50 | No | | 50 | No | Nd | Nd |
| Comp. Ex. 6 | 50 | No | | 50 | Yes | <0.1 | Nd |

As clearly seen in Table 1, gas permeation could not be detected in Comparative Example 1, in which the first gas and second gas had not been humidified. In Comparative Example 3, where operation was carried out for 7 days according to Comparative Example 2 in which the module interior was not filled with an absorbing solution, a low separation factor α was obtained.

A low separation factor α was also obtained in Comparative Example 4, in which no chitosan layer was coated.

In both Comparative Examples 5 and 6, in which the module for gas separation 1 did not contain a metal salt, the propylene gas permeability was low and the separation factor α was low, regardless of the presence of a humidified atmosphere.

In contrast, in Examples 1 and 2 in which the module was filled with an absorbing solution, a high separation factor α of higher than 300, for example, was obtained. Moreover, by circulating the absorbing solution as in Example 3, it was possible to lower the concentration polarization of gas in the absorbing solution and recover the desired gas component at a high speed. However, while a lowered separation factor was observed during a prolonged period of 7 days in Examples 5 and 6 in which the adhesive was urethane, a high separation factor α was maintained even for a prolonged period of 7 days in Example 4 where the adhesive was an epoxy adhesive.

Furthermore, when the supports of the composite hollow fiber membranes were changed to PSf from PES, as in Examples 9 and 10, a lowering of the separation factor was observed during a prolonged period of 7 days. When the supports of the composite hollow fiber membranes were changed to PVDF from PES, as in Examples 7, 8, 11 and 12, there was no lowering of the separation factor during a prolonged period of 7 days, and satisfactory results were obtained.

When the source gas was 99.5% propylene gas, as in Examples 13 and 14, the propylene partial pressure of the first gas was higher compared to Examples 1 to 10, and therefore the Flux increased and the separation factor α was >500. The propane concentration of the permeation gas was 0.1 to 50 ppm, with 100 as the total amount of propylene, propane, oxygen and carbon dioxide. The propylene concentration was 99.995% or greater, the oxygen concentration was 0.1 to 5 ppm and the carbon dioxide concentration was 0.1 to 5 ppm.

When draft tubes were used as in Examples 15 and 16, the absorbing solution circulation speed inside the module for gas separation 1 was higher than in Examples 13 and 14, and therefore the Flux further increased. The separation factor α was >500, which was equal to Examples 13 to 14.

Even when a mixed gas of butadiene and carbon dioxide was used for the first gas as in Examples 17 and 18, it was possible to separate the butadiene as olefin gas.

When a mixed gas of carbon dioxide and nitrogen was used as the first gas as in Examples 19 and 20, carbon dioxide could be separated by using an amine-based absorbing solution, for example.

The embodiments of the invention described above are not intended to place limitations on the invention, and various modifications may be incorporated such as fall within the gist of the invention.

INDUSTRIAL APPLICABILITY

By using a module for gas separation according to the present invention it is possible to obtain a high permeation rate and high separation performance for desired gases, to continuously retain water in the gas separation active layer uniformly for prolonged periods and therefore to maintain high separation performance for prolonged periods, and it can be widely used as a module for gas separation that separates and recovers olefin gases or carbon dioxide from synthetic gas or natural gas, as for example, a module for gas separation that produces hydrocarbon gas as an amorphous carbon source for a semiconductor process, or a module for gas separation that separates and recovers bio-olefin gas synthesized using mainly polysaccharides as starting material.

REFERENCE SIGNS LIST

1 Module for gas separation
2 Hollow fiber support
3 Gas separation active layer
4 Composite hollow fiber membrane
5 Exterior body
5a Source gas (first gas) supply port
5b Source gas (first gas) discharge port
6 Partition
7 Header section
7a Feed gas (second gas) supply port
7b Feed gas (second gas) discharge port
8 Absorbing solution
9 Circulation line
10 Gas absorption tube
10a Source gas supply line
10b Unabsorbed gas discharge line
11 Circulating pump
12 Draft tube

The invention claimed is:

1. A module for gas separation having a gas separation membrane disposed in an interior of an exterior body,
wherein the module has a first space enclosed by an outer side of the gas separation membrane and the exterior body and a second space on an inner side of the gas separation membrane, the first space and second space being separated by the gas separation membrane, and the first space is filled with an absorbing solution selected from the group consisting of water, and liquids or ionic liquids including at least one compound selected from the group consisting of amines, amino acids, carbonates, silver salts and copper salts, and
wherein the module has a draft tube between the exterior body and the gas separation membrane.

2. The module for gas separation according to claim 1, wherein the gas separation membrane is a hollow fiber membrane having a porous hollow fiber support and a gas separation active layer situated on a surface of the hollow fiber support.

3. The module for gas separation according to claim 1, wherein the exterior body has a supply port and a discharge port for a first gas that passes through the first space, and a supply port and a discharge port for a second gas that passes through the second space.

4. The module for gas separation according to claim 2, wherein the hollow fiber membrane is a composite hollow fiber membrane having a porous hollow fiber support and a gas separation active layer situated on the surface of the hollow fiber support.

5. The module for gas separation according to claim 3, wherein the first gas is a mixed gas including the gas component to be separated, and the second gas is a feed gas that is to recover the separated gas.

6. The module for gas separation according to claim 1, wherein moisture is present in the second space.

7. The module for gas separation according to claim 6, wherein a moisture content is 0.1% or higher and 5.0% or lower.

8. The module for gas separation according to claim 3, wherein the discharge port and supply port for the first gas are connected.

9. The module for gas separation according to claim 8, wherein the absorbing solution circulates through the discharge port and supply port for the first gas.

10. The module for gas separation according to claim 2, wherein the gas separation active layer is composed mainly of a polymer gel, and the thickness of the layer is 10 nm or greater and 10 μm or smaller.

11. The module for gas separation according to claim 10, wherein the polymer gel is chitosan.

12. The module for gas separation according to claim 2, wherein the porous hollow fiber support is composed mainly of polyethersulfone or polyvinylidene fluoride.

13. The module for gas separation according to claim 2, wherein the module has partitions that adhesively anchor both ends of the hollow fiber membrane to the exterior body while separating the first space and the second space, the partitions being made of an epoxy resin obtained by curing a composition containing a compound with an epoxy group as the base compound and a compound with an acid anhydride group as a curing agent.

14. The module for gas separation according to claim 1, wherein the absorbing solution includes an aqueous solution including at least one metal salt selected from the group consisting of silver salts and copper salts, and the gas separation layer also contains the same metal salt as the absorbing solution.

15. The module for gas separation according to claim 1, wherein a percentage of the first space occupied by the absorbing solution is 5 to 99 vol %.

16. The module for gas separation according to claim 14, wherein the silver salt or copper salt in the absorbing solution filling the first space is 5 wt % to 90 wt % with respect to the total weight of the water.

17. The module for gas separation according to claim 1, wherein pressure conditions in the first space are 0.1 to 2.5 MPaG.

18. The module for gas separation according to claim 3, wherein a moisture content of the second gas is 0.1 to 99%.

19. The module for gas separation according to claim 3, wherein a content of inert gas in the second gas is 0.1 to 99%.

20. A gas separation method in which a module for gas separation according to claim 5 is used to separate the gas to be separated from the mixed gas, the method being carried out under conditions in which a partial pressure of the gas to be separated in the first gas is higher than a partial pressure of the gas to be separated in the second gas.

21. A gas separation method in which moisture in a gas separated by the gas separation method according to claim 20 is separated by dehydrating equipment.

22. The gas separation method according to claim 20, wherein the first gas is an olefin and/or carbon dioxide.

23. The gas separation method according to claim 22, wherein the olefin contains any one of ethylene, propylene, isobutene, butene or butadiene.

24. The gas separation method according to claim 22, wherein the olefin is a bio-olefin.

25. The gas separation method according to claim 21, wherein, after separation of moisture by the dehydrating equipment, the separated gas has a content of olefin of 99.99% or greater, and a content of paraffin of 0.1 to 100 ppm.

26. The gas separation method according to claim 20, which produces olefin gas having a propane content of 0.1 to 50 ppm and a purity of 99.995% or greater.

27. An olefin gas having a propane content of 0.1 to 50 ppm and a purity of 99.995% or greater.

28. An olefin gas having an oxygen content of 0.1 to 5 ppm and a purity of 99.995% or greater.

29. An olefin gas having a carbon dioxide content of 0.1 to 5 ppm and a purity of 99.995% or greater.

30. The gas separation method according to claim 22, wherein the olefin is produced from a fermentation gas.

* * * * *